US011669745B2

(12) United States Patent
Ramaiah et al.

(10) Patent No.: US 11,669,745 B2
(45) Date of Patent: Jun. 6, 2023

(54) PROPOSAL LEARNING FOR SEMI-SUPERVISED OBJECT DETECTION

(71) Applicant: salesforce.com, inc., San Francisco, CA (US)

(72) Inventors: Chetan Ramaiah, San Bruno, CA (US); Peng Tang, Mountain View, CA (US); Caiming Xiong, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 255 days.

(21) Appl. No.: 17/080,276

(22) Filed: Oct. 26, 2020

(65) Prior Publication Data

US 2021/0216828 A1 Jul. 15, 2021

Related U.S. Application Data

(60) Provisional application No. 62/960,630, filed on Jan. 13, 2020.

(51) Int. Cl.
*G06F 18/21* (2023.01)
*G06N 3/082* (2023.01)
*G06F 18/214* (2023.01)

(52) U.S. Cl.
CPC ...... *G06F 18/2178* (2023.01); *G06F 18/2155* (2023.01); *G06N 3/082* (2013.01)

(58) Field of Classification Search
CPC .... G06K 9/6263; G06K 9/6259; G06N 3/082; G06N 3/0481; G06N 3/0454; G06N 3/088; G06V 10/764; G06V 10/7753; G06V 10/7784; G06V 10/82
See application file for complete search history.

(56) References Cited

U.S. PATENT DOCUMENTS

| | | | |
|---|---|---|---|
| 10,269,125 B1 * | 4/2019 | Kim | G06K 9/6256 |
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |

(Continued)

OTHER PUBLICATIONS

Self-supervised Sample Mining, Wang et al., 2018 (Year: 2018).*

(Continued)

*Primary Examiner* — Jianxun Yang
(74) *Attorney, Agent, or Firm* — Haynes and Boone, LLP

(57) ABSTRACT

A method for generating a neural network for detecting one or more objects in images includes generating one or more self-supervised proposal learning losses based on the one or more proposal features and corresponding proposal feature predictions. One or more consistency-based proposal learning losses are generated based on noisy proposal feature predictions and the corresponding proposal predictions without noise. A combined loss is generated using the one or more self-supervised proposal learning losses and one or more consistency-based proposal learning losses. The neural network is updated based on the combined loss.

20 Claims, 4 Drawing Sheets

(56) References Cited

U.S. PATENT DOCUMENTS

| | | | |
|---|---|---|---|
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 10,817,650 B2 | 10/2020 | McCann et al. | |
| 10,839,284 B2 | 11/2020 | Hashimoto et al. | |
| 10,846,478 B2 | 11/2020 | Lu et al. | |
| 10,902,289 B2 | 1/2021 | Gao et al. | |
| 10,909,157 B2 | 2/2021 | Paulus et al. | |
| 10,929,607 B2 | 2/2021 | Zhong et al. | |
| 10,958,925 B2 | 3/2021 | Zhou et al. | |
| 10,963,652 B2 | 3/2021 | Hashimoto et al. | |
| 10,963,782 B2 | 3/2021 | Xiong et al. | |
| 10,970,486 B2 | 4/2021 | Machado et al. | |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373987 A1 | 12/2018 | Zhang et al. | |
| 2019/0043003 A1* | 2/2019 | Fisher | G06V 10/82 |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0302178 A1 | 9/2020 | Gao et al. | |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0364580 A1 | 11/2020 | Shang et al. | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | McCann et al. | |
| 2021/0042604 A1 | 2/2021 | Hashimoto et al. | |
| 2021/0049236 A1 | 2/2021 | Nguyen et al. | |
| 2021/0073459 A1 | 3/2021 | McCann et al. | |
| 2021/0089588 A1 | 3/2021 | Le et al. | |
| 2021/0089882 A1 | 3/2021 | Sun et al. | |
| 2021/0089883 A1 | 3/2021 | Li et al. | |

OTHER PUBLICATIONS

Athiwaratkun et al., "There are many consistent explanations of unlabeled data: Why you should average," arXiv preprint arXiv:1806.05594, 2018.

Bell et al., "Inside-outside net: Detecting objects in context with skip pooling and recurrent neural networks," In Proceedings of the IEEE conference on computer vision and pattern recognition, 2016, pp. 2874-2883.

Blum et al., "Combining labeled and unlabeled data with co-training," In Proceedings of the eleventh annual conference on Computational learning theory, 1998, pp. 92-100.

Cai et al., "Cascade R-CNN: Delving into high quality object detection," In Proceedings of the IEEE conference on computer vision and pattern recognition, 2018, pp. 6154 6162.

Chapelle et al., "Semi-supervised learning," 2010.

Chen et al., "MMDetection: Open MMLab detection toolbox and benchmark," arXiv preprint arXiv:1906.07155, 2019.

Divvala et al., "An empirical study of context in object detection," In Proceedings of the IEEE conference on computer vision and pattern recognition, 2009, pp. 1271-1278.

Doersch et al., "Unsupervised visual representation learning by context prediction," In Proceedings of the IEEE international conference on computer vision, 2015, pp. 1422-1430.

Everingham et al., "The pascal visual object classes challenge: A retrospective," International journal of computer vision, vol. 111, No. 1, 2015, pp. 98-136.

Gao et al., "NOTE-RCNN: Noise tolerant ensemble RCNN for semi-supervised object detection," In Proceedings of the IEEE international conference on computer vision, 2019, pp. 9508-9517.

Ghiasi et al., "Dropblock: A regularization method for convolutional networks," In Advances in neural information processing systems, 2018, pp. 10727-10737.

Gidaris et al., "Unsupervised representation learning by predicting image rotations," arXiv preprint arXiv:1803.07728, 2018.

Girshick et al., "Rich feature hierarchies for accurate object detection and semantic segmentation," In Proceedings of the IEEE conference on computer vision and pattern recognition, 2014, pp. 580-587.

He et al., "Deep residual learning for image recognition," In Proceedings of the IEEE conference on computer vision and pattern recognition, 2016, pp. 770-778.

He et al., "Mask R-CNN," In Proceedings of the IEEE international conference on computer vision, 2017, pp. 2980-2988.

He et al., "Momentum contrast for unsupervised visual representation learning," arXiv preprint arXiv:1911.05722, 2019.

Hoffman et al., "LSDA: Large scale detection through adaptation," In Advances in Neural Information Processing Systems, 2014, pp. 3536-3544.

Hu et al., "Relation networks for object detection," In Proceedings of the IEEE conference on computer vision and pattern recognition, 2018, pp. 3588-3597.

Huang et al., "Mask scoring R-CNN," In Proceedings of the IEEE conference on computer vision and pattern recognition, 2019, pp. 6409-6418.

Jeong et al., "Consistency-based semi-supervised learning for object detection," In Advances in neural information processing systems, 2019, pp. 10758-10767.

Jing et al., "Self-supervised visual feature learning with deep neural networks: A survey," arXiv preprint arXiv:1902.06162, 2019.

Kolesnikov et al., "Revisiting self-supervised visual representation learning," In Proceedings of the IEEE conference on computer vision and pattern recognition, 2019, pp. 1920-1929.

Krizhevsky et al., "ImageNet classification with deep convolutional neural networks," In Advances in neural information processing systems, 2012, pp. 1097-1105.

(56) References Cited

OTHER PUBLICATIONS

LeCun et al., "Gradient-based learning applied to document recognition," Proceedings of the IEEE, vol. 86, No. 11, 1998, pp. 2278-2324.
Lin et al., "Feature pyramid networks for object detection," In Proceedings of the IEEE conference on computer vision and pattern recognition, 2017, pp. 2117-2125.
Lin et al., "Focal loss for dense object detection," IEEE transactions on pattern analysis and machine intelligence, 2018.
Lin et al., "Microsoft COCO: Common objects in context," In European conference on computer vision, 2014, pp. 740-755.
Liu et al., "SSD: Single shot multibox detector," In European conference on computer vision, 2016, pp. 21-37.
Michaelis et al., "Benchmarking robustness in object detection: Autonomous driving when winter is coming," arXiv preprint arXiv: 1907.07484, 2019.
Miyato et al., "Virtual adversarial training: a regularization method for supervised and semi-supervised learning," IEEE transactions on pattern analysis and machine intelligence, vol. 41, No. 8, 2018, pp. 1979-1993.
Mottaghi et al., "The role of context for object detection and semantic segmentation in the wild," In Proceedings of the IEEE conference on computer vision and pattern recognition, 2014, pp. 891-898.
Paszke et al., "PyTorch: An imperative style, high-performance deep learning library," In Advances in neural information processing systems, 2019, pp. 8024-8035.
Pathak et al., "Context encoders: Feature learning by inpainting," In Proceedings of the IEEE conference on computer vision and pattern recognition, 2016, pp. 2536-2544.
Qiao et al., "Deep co-training for semi-supervised image recognition," In European conference on computer vision, 2018, pp. 135-152.
Radosavovic et al., "Data distillation: Towards omni-supervised learning," In Proceedings of the IEEE conference on computer vision and pattern recognition, 2018, pp. 4119-4128.
Redmon et al., "You only look once: Unified, real-time object detection," In Proceedings of the IEEE conference on computer vision and pattern recognition, 2016, pp. 779-788.
Ren et al., "Faster R-CNN: Towards real-time object detection with region proposal networks," IEEE transactions on pattern anal-ysis and machine intelligence, vol. 39, No. 6, 2017, pp. 1137-1149.
Ross Girshick, "Fast R-CNN," In Proceedings of the IEEE international conference on computer vision, 2015, pp. 1440-1448.
Russakovsky et al., "Imagenet large scale visual recognition challenge," International journal of computer vision, vol. 115, No. 3, 2015, pp. 211-252.
Sajjadi et al., "Regularization with stochastic transformations and perturbations for deep semi-supervised learning," In Advances in neural information processing systems, 2016, pp. 1163-1171.
Samuli et al., "Temporal ensembling for semi-supervised learning," arXiv preprint arXiv:1610.02242, 2016.
Shao et al., "Objects365: A large-scale, high-quality dataset for object detection," In Proceedings of the IEEE international conference on computer vision, 2019, pp. 8430-8439.
Tang et al., "Large scale semi-supervised object detection using visual and semantic knowledge transfer," In Proceedings of the IEEE conference on computer vision and pattern recognition, 2016, pp. 2119-2128.
Tang et al., "Object detection in videos by high quality object linking," IEEE transactions on pattern analysis and machine intelligence, 2019.
Tarvainen et al., "Mean teachers are better role models: Weight-averaged consistency targets improve semi-supervised deep learning results," In Advances in neural information processing systems, 2017, pp. 1195-1204.
Tompson et al., "Efficient object localization using convolutional networks," In Proceedings of the IEEE conference on computer vision and pattern recognition, 2015, pp. 648-656.
Wang et al., "A-Fast-RCNN: Hard positive generation via adversary for object detection," In Proceedings of the IEEE Conference on computer vision and pattern recognition, 2017, pp. 2606-2615.
Wang et al., "Deep high-resolution representation learning for visual recognition," arXiv preprint arXiv:1908.07919, 2019.
Wu et al., "Unsupervised feature learning via non-parametric instance discrimination," In Proceedings of the IEEE conference on computer vision and pattern recognition, 2018 pp. 3733-3742.
Xie et al., "Aggregated residual transformations for deep neural networks," In Proceedings of the IEEE conference on computer vision and pattern recognition, 2017, pp. 1492-1500.
Xie et al., "Unsupervised data augmentation," arXiv preprint arXiv:1904. 12848, 2019.
Yarowsky et al., "Unsupervised word sense disambiguation rivaling supervised methods," In Proceedings of the 33rd annual meeting of the association for computational linguistics, 1995, pp. 189-196.
Ye et al., "Unsupervised embedding learning via invariant and spreading instance feature," In Proceedings of the IEEE Conference on computer vision and pattern recognition, 2019, pp. 6210-6219.
Zhai et al., "S4L: Self-supervised semi-supervised learning," In Proceedings of the IEEE international conference on computer vision, 2019, pp. 1476-1485.
Zhang et al., "Colorful image colorization," In European conference on computer vision, 2016, pp. 649-666.
Zhang et al., "Single-shot object detection with enriched semantics," In Proceedings of the IEEE conference on computer vision and pattern recognition, 2018, pp. 5813-5821.
Zhou et al., "Semi-supervised 3D abdominal multi-organ segmentation via deep multi-planar co-training," In IEEE winter conference on applications of computer vision, 2019, pp. 121-140.
Zhu et al., "Learning from labeled and unlabeled data with label propagation," 2002.
Zhu et al., Deformable ConvNets v2: More deformable, better results, In Proceedings of the IEEE conference on computer vision and pattern recognition, 2019, pp. 9308-9316.

\* cited by examiner

PROPOSAL LEARNING FOR SEMI-SUPERVISED OBJECT DETECTION

RELATED APPLICATIONS

This application claims priority to U.S. Provisional Patent Application No. 62/960,630 filed Jan. 13, 2020, which is incorporated by reference herein in its entirety.

TECHNICAL FIELD

The present disclosure relates generally to neural networks and more specifically to training neural networks by proposal learning for semi-supervised object detection.

BACKGROUND

The remarkable success in training neural networks (NNs) is largely attributed to the collection of large datasets with human annotated labels. However, training accurate object detectors relies on the availability of large scale labeled datasets, which are very expensive and time-consuming to collect. In addition, training object detectors only on the labeled datasets may limit the accuracies of these object detectors. By contrast, acquiring unlabeled data is much easier than collecting labeled data.

Accordingly, it would be advantageous to develop systems and methods for improved learning with by training on both labeled and unlabeled data.

In the figures, elements having the same designations have the same or similar functions.

DETAILED DESCRIPTION

Figure 1:
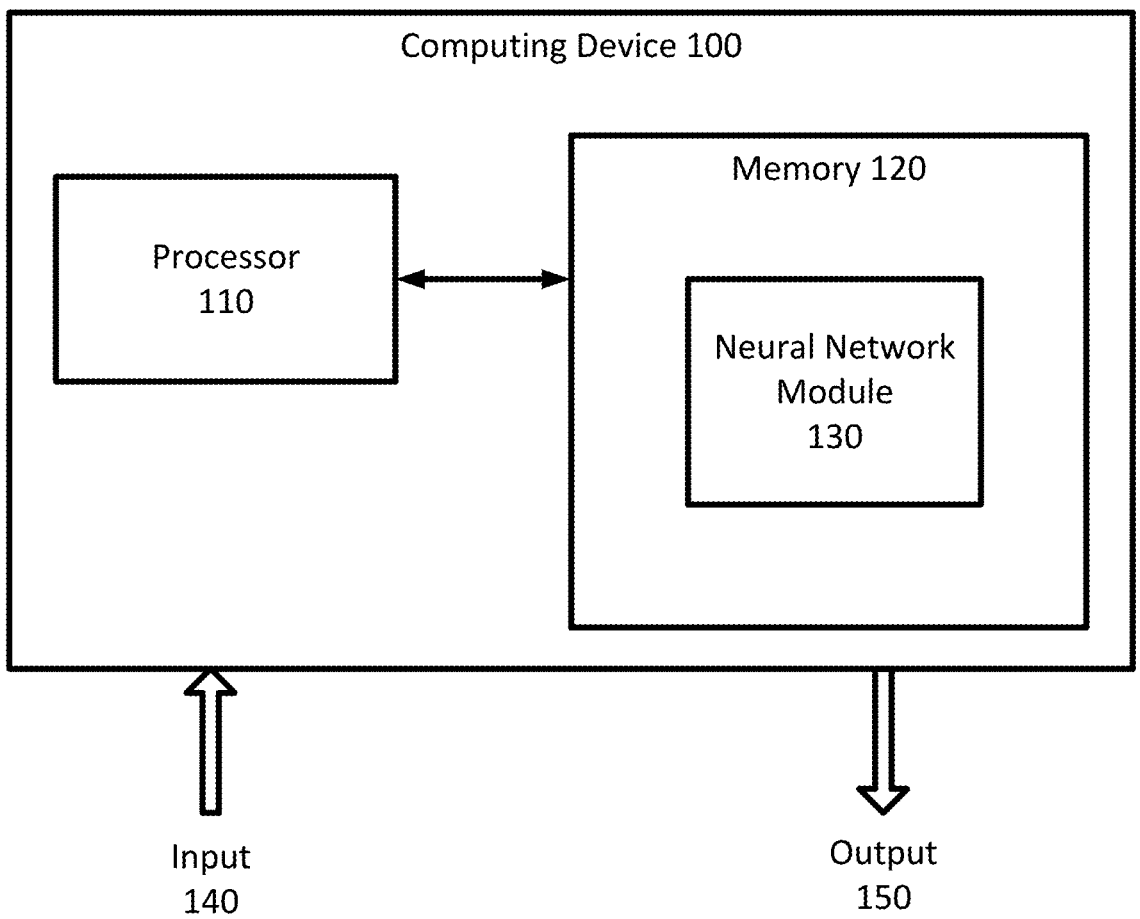
FIG. 1 is a simplified diagram of a computing device according to some embodiments.

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a neural network module 130 that may be used to implement and/or emulate the neural network systems and models described further herein and/or to implement any of the methods described further herein. In some examples, neural network module 130 may be used to translate structured text. In some examples, neural network module 130 may also handle the iterative training and/or evaluation of a translation system or model used to translate the structured text. In some examples, memory 120 may include non-transitory, tangible, machine readable media that includes executable code that when run by one or more processors (e.g., processor 110) may cause the one or more processors to perform the counting methods described in further detail herein. In some examples, neural network module 130 may be implemented using hardware, software, and/or a combination of hardware and software. As shown, computing device 100 receives input 140, which is provided to neural network module 130, neural network module 130 then generates output 150.

Figure 2:
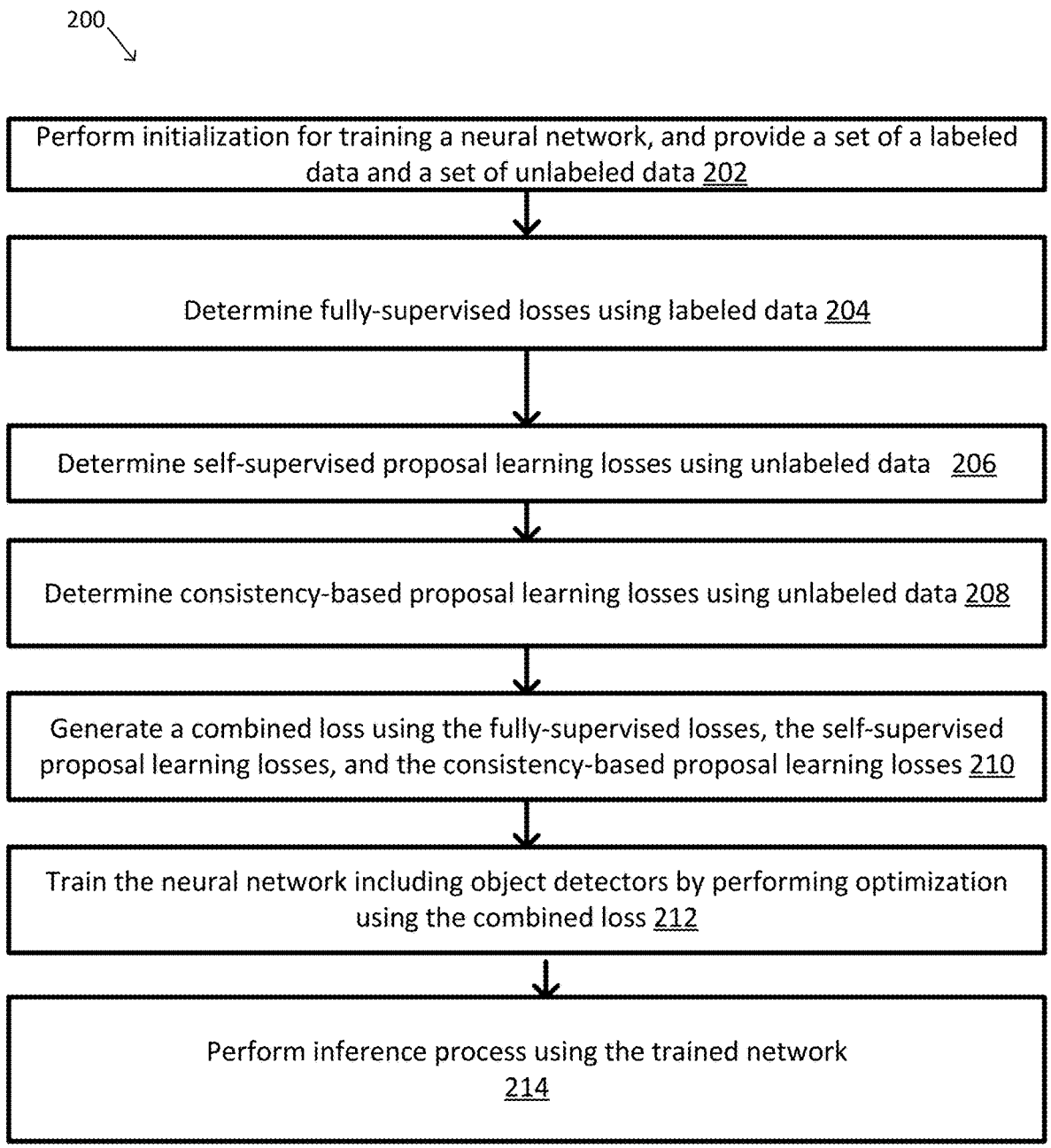
FIG. 2 is a simplified diagram of a method of training a neural network model according to some embodiments.

FIG. 2 is a simplified diagram of a method 200 for training a neural network model using proposal learning to learn proposal features and predictions from both labeled and unlabeled data and performing a task using the trained neural network model according to some embodiments. One or more of the processes 202-214 of method 200 may be implemented, at least in part, in the form of executable code stored on non-transitory, tangible, machine-readable media that when run by one or more processors may cause the one or more processors to perform one or more of the processes 202-214. In some embodiments, the method 200 may correspond to the method used by neural network module 130 to perform training and/or perform inference using the trained neural network model for various tasks (e.g., classification, prediction, diagnoses and prediction on medical diseases, image recognition, natural language processing, etc.).

The method 200 performs proposal learning to learn proposal features and predictions from both labeled and unlabeled data. The method 200 includes self-supervised proposal earning and consistency-based proposal learning. During the self-supervised proposal learning, a proposal location loss and a contrastive loss are used to learn context-aware and noise-robust proposal features respectively. During the consistency-based proposal learning, consistency losses are applied to both bounding box classification and regression predictions of proposals to learn noise-robust proposal features and predictions.

The method 200 begins at block 202, where a processor performs initialization for training a neural network model. At block 202, the method 200 may receive various inputs. For example, the inputs may include a set of labeled data and a set of unlabeled data.

The method 200 may proceed to block 204, where the processor may perform supervised training using the set of labeled data. In some examples, a fully-supervised loss is generated for each labeled data in the set of labeled data.

The method 200 may proceed to blocks 206 and 208, where the process may perform training using the unlabeled training data. In some examples, at block 206, a self-supervised proposal learning loss is generated for each unlabeled data in the set of unlabeled data. In some examples, at block 208, a consistency-based proposal learning loss is generated for each unlabeled data in the set of unlabeled data.

The method 200 may proceed to block 210, where the processor may generate a combined loss using two or more of the fully-supervised losses, the self-supervised proposal learning losses, and the consistency-based proposal learning losses.

The method 200 may proceed to block 212, where the processor may train the neural network (e.g., including object detectors) by performing optimization using the combined loss. Various optimization methods, e.g., back propagation, may be used.

The method 200 may proceed to block 214, where the trained network is deployed to perform an inference process for a particular task (e.g., classification, prediction, diagnoses and prediction on medical diseases, image recognition, natural language processing, etc.).

Figure 3:
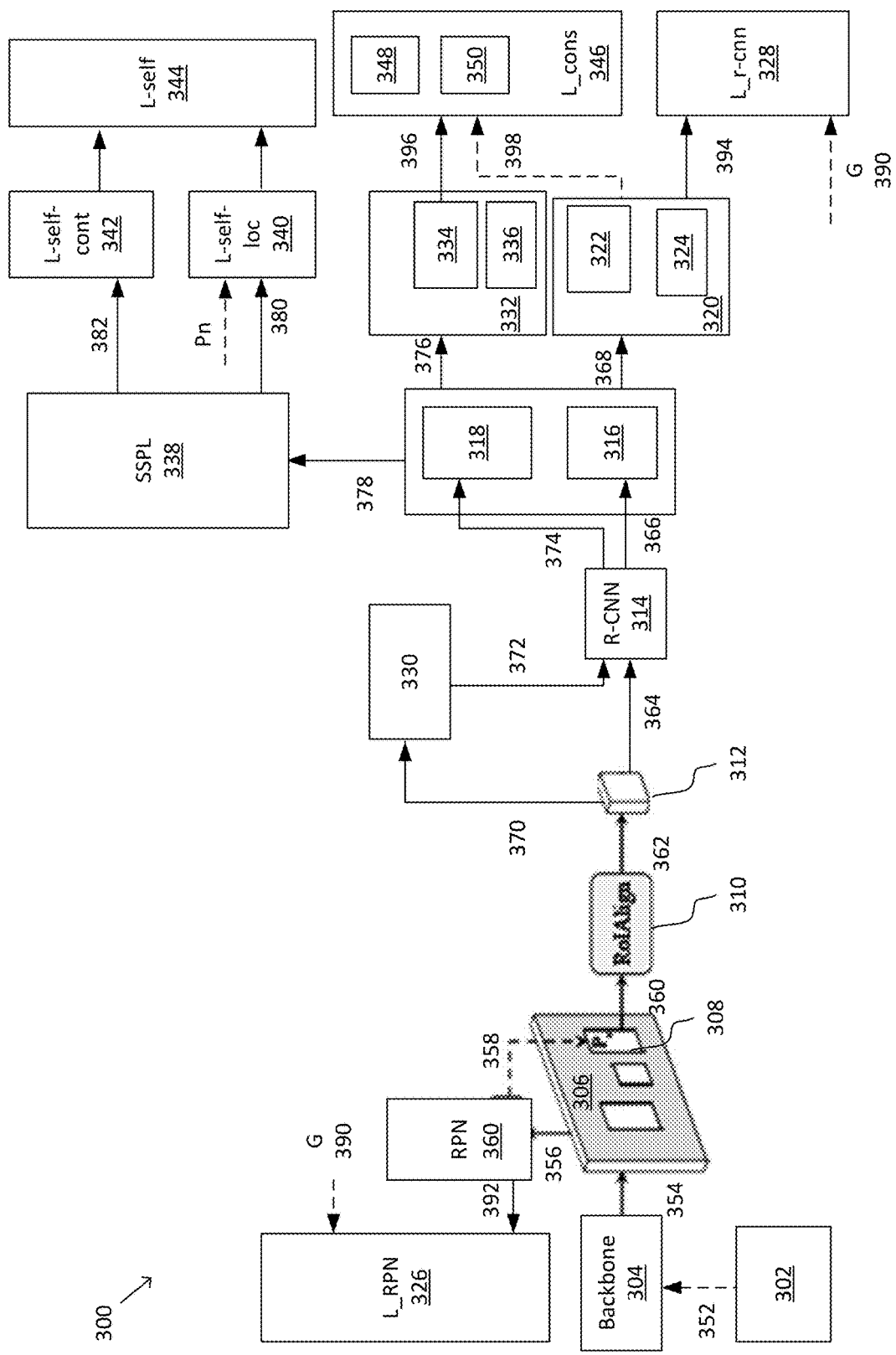
FIG. 3 is a simplified diagram of a neural network model according to some embodiments.

Referring to the example of FIG. 3, illustrated therein is a neural network system 300 for object detection. As shown in FIG. 3, the neural network system 300 is trained by performing proposal learning to learn proposal features and predictions from both labeled and unlabeled data (e.g., training steps 202-212 of method 200 of FIG. 2). In the system of FIG. 3, all the steps 352 through 396 have forward computations during the training, and steps with solid lines (e.g., steps 354, 356, 360, 362, 364, 366, 368, 370, 372, 374, 376, 378, 380, 382, 392, 394, 396) have back-propagation computations as well. In other words, steps with dashed lines (e.g., steps 352, 358, 390, and 398) do not have back-propagation computations. Also, steps 392 and 394 are performed only with labeled data, with ground label truth G 390. The other steps may be performed with unlabeled data, labeled data, or a combination thereof.

Basic Components

The neural network 300 includes a number of neural network components, each may include a neural network. The neural network components include for example, a backbone neural network 304, a Region Proposal Network (RPN) 360, a region of interest align (RoIAlign) layer 310, a Region-based CNN (R-CNN) 314, and a Self-Supervised Proposal Learning (SSPL) 338.

In some embodiments, during a training process, at step 352, an image 302 (denoted as I) from a training set is fed into the backbone neural network 304 with parameters $\theta^b$. The backbone neural network 304 may include a convolutional neural network (CNN), for example, a ResNet-50 model with feature pyramid networks), or any other suitable neural networks. At step 354, the backbone neural network 304 generates image convolutional feature maps 306, denoted as $F^b(I; \theta^b)$.

In some embodiments, at step 356, the RPN 360 with parameters $\theta^{rpn}$ receives image convolutional feature maps 306 $F^b(I; \theta^b)$ (also referred to as $F^b$) as inputs. The RPN 360, at step 358, generates region proposals 308 (denoted as $P(F^b(I; \theta^b); \theta^{rpn})$, also referred to as P), based on the image convolutional feature maps 306 $F^b(I; \theta^b)$.

In some embodiments, at step 360, the RoIAlign layer 310 takes each proposal $P_n=(x_n, y_n, w_n, h_n)$ in region proposals 308 P and $F^b$ as inputs, where $(x_n, y_n, w_n, h_n)$ denotes the location of the $i^{th}$ proposal $P_n$, $i \in \{1, 2, \ldots, N\}$, and N is the number of proposals in P.

At step 362, the RoIAlign layer 310 extracts proposal convolutional feature maps 312 $F_n^{p\text{-}conv}$, which is a simplification of $F^{p\text{-}conv}(F^b, P_n)$ by dropping the dependence on $F^b$, $P_n$.

In some embodiments, at step 364, proposal convolutional feature maps 312 $F_n^{p\text{-}conv}$ is fed into a Region-based CNN (R-CNN) 314.

In some embodiments, at step 366, the R-CNN 314 generates proposal features 316 $F^p(F_n^{p\text{-}conv}; \theta^{r\text{-}cnn})$, also referred to as $F_n^p$. $\theta^{r\text{-}cnn}$ denotes parameters of the R-CNN 314 to generate proposal features 316. At step 368, the R-CNN 314 generates predictions 320. The predictions 320 may include different types of predictions. For example, the predictions 320 may include bounding box classification predictions 322 $C^p(F^p(F_n^{p\text{-}conv}; \theta^{r\text{-}cnn}); \theta^{cls})$, also referred to as $C_n^p$, where $\theta^{cls}$ denotes parameters of the R-CNN to generate bounding box classification predictions. For further example, the predictions 320 may include bounding box regression predictions 324 $R^p(F^p(F_n^{p\text{-}conv}; \theta^{r\text{-}cnn}; \theta^{reg}))$, also referred to as $R_n^p$, where $\theta^{reg}$ denote parameters of the R-CNN to generate bounding box regression predictions.

Fully-Supervised Learning

As shown in FIG. 3, a supervised loss is generated using labeled data (e.g., at block 204 of method 200). The supervised loss may be generated using steps 392 and 394 are performed only for labeled data having ground truth label G, and are not performed for unlabeled data. Specifically, for each input image 302 that is a labeled image (also referred to as labeled data), the neural network 300 is trained based on a supervised loss $L^{sup}$, e.g., as follows:

$$L^{sup}(I, \mathcal{G}; \theta^b, \theta^{rpn}, \theta^{r\text{-}cnn}, \theta^{cls}, \theta^{reg}) = \qquad (1)$$

$$L^{rpn}(I, \mathcal{G}; \theta^b, \theta^{rpn}) + \frac{1}{N}\sum_n L^{r\text{-}cnn}(I, P_n, \mathcal{G}, \theta^b, \theta^{r\text{-}cnn}, \theta^{cls}, \theta^{reg}) =$$

$$L^{rpn}(F^b, \mathcal{G}; \theta^{rpn}) + \frac{1}{N}\sum L^{r\text{-}cnn}(C_n^p, R_n^p, \mathcal{G}).$$

Specifically, the first term $L^{rpn}$ and second term $L^{r\text{-}cnn}$ denote the RPN loss and R-CNN loss respectively, G is the ground truth labels, and this supervised loss $L^{sup}$ is optimized with regard to $\theta^b$, $\theta^{rpn}$, $\theta^{r\text{-}cnn}$, $\theta^{cls}$, $\theta^{reg}$ to train the neural network 300 (also referred to as object detectors 300) during the back-propagation process (e.g., steps with solid lines as shown in FIG. 3). For example, as shown in FIG. 3, at step 392, $L^{rpn}$ 326 for labeled data I with ground label truth G is generated using RPN 360 with respect to parameters $\theta^{rpn}$ and $\theta^b$. For further, as shown in FIG. 3, at step 394, $L^{r\text{-}cnn}$ 328 for labeled data I with ground label truth G is generated using R-CNN 314 with regard to $\theta^b$, $\theta^{rpn}$, $\theta^{r\text{-}cnn}$, $\theta^{cls}$, $\theta^{reg}$.

Proposal Learning

For each input image 302 that is an unlabeled image, there is no ground truth labels G. To train the neural network 300 with an unlabeled image, a proposal learning (e.g., at blocks 206 and 208 of method 200) is performed. Such a proposal learning includes using a self-supervised proposal learning module to learn proposal features (e.g., F") from unlabeled data (e.g., at block 206 of method 200), and a consistency-based proposal learning module to learn predictions (e.g., bounding box classification predictions 322 $C_n^p$, bounding box regression predictions 324 $R_n^p$, any other suitable predictions, and/or a combination thereof) (e.g., at block 208 of method 200).

It is noted that while the discussion below focuses on optimizing the R-CNN 314 using the unlabeled data, it is possible to also benefit RPN 360 from the unlabeled data. The discussion below focuses on optimizing R-CNN-related parts including R-CNN 314 using the unlabeled data, because 1) the final object detection results are from R-CNN-related parts and thus improving the R-CNN-related parts will benefit object detectors directly; 2) gradients will also be back-propagated from the R-CNN-related parts to the backbone 304 to learn better image convolutional feature maps 306, which may benefit RPN 360.

In the example of FIG. 3, at step 370, noise (e.g., random noise $\{\epsilon_{nk}\}_{k=1}^K$ or any other suitable noise) is added to proposal convolutional feature maps 312 $F_n^{p\text{-}conv}$, and generates a set of noisy proposal convolutional feature maps 330 $\hat{F}_n^{p\text{-}conv}$, e.g., $$\hat{\mathcal{F}}_n^{p\text{-}conv} = \{\hat{F}^{p\text{-}conv}(F_n^{p\text{-}conv}, \epsilon_{nk})\}_{k=1}^K.$$

At step 366, the R-CNN 314 generates proposal features 316 $F^p(F_n^{p\text{-}conv}; \theta^{r\text{-}cnn})$, also referred to as $F_n^p$. $\theta^{r\text{-}cnn}$ denotes parameters of the R-CNN 314 to generate proposal features 316.

Similar to steps 366 and 368 to generate proposal features 316 $F^p$ and predictions 320, at steps 374 and 376 are performed to generate noisy proposal features 318 and noisy predictions 324 and 326. Specifically, at step 374, the R-CNN 314 generates noisy proposal features 318 $\hat{\mathcal{F}}_n^p = \{\hat{F}_{nk}^p\}_{k=1}^K$ using noisy proposal convolutional feature maps 330. At step 376, R-CNN 314 generates noisy predictions 332. The noisy predictions 332 may include different types of noisy predictions. For example, the noisy predictions 332 may include noisy bounding box classification predictions 334, e.g., $\hat{\mathcal{C}}_n^p = \{\hat{C}_{nk}^p\}_{k=1}^K$ and noisy bounding box regression predictions 336 $\hat{\mathcal{R}}_n^p = \{\hat{R}_{nk}^p\}_{k=1}^K$.

Self-Supervised Proposal Learning

In various embodiments, the self-supervised proposal learning module uses different types of losses to learn different types of features. For example, a proposal location loss is used to learn context-aware proposal features, and a contrastive loss is used to learn noise-robust proposal features respectively.

In some embodiments, the self-supervised proposal learning module uses a proposal location loss 340 $L^{self\text{-}loc}$ to learn context-aware proposal features. To compute the proposal location loss 340 $L^{self\text{-}loc}$, a proposal location prediction as the pretext task is used. At process 378, proposal feature 316 $F_n^p$ and noisy proposal features 318 $\hat{F}_n^p$ are sent to the SSPL 338. In an example, the SSPL 338 has two fully-connected layers with parameters $\theta^{self\text{-}loc}$ and a sigmoid layer to compute location predictions Ln and noisy location predictions $\hat{\mathcal{L}}_n^p = \{\hat{L}_{nk}^p\}_{k=1}^K$. In an example, the numbers of the outputs of the two fully-connected layers are 1024 and 4 respectively.

At process 380, a proposal location loss 340 $L^{self\text{-}loc}$ is computed, for example, as follows:

$$L^{self\text{-}loc}(F_n^p, \hat{\mathcal{F}}_n^p, P_n; \theta^{self\text{-}loc}) =$$

-continued
$$L^{self\text{-}loc}(L_n^p, \hat{\mathcal{L}}_n^p, P_n) = \frac{1}{K+1}\left(\|L_n^p - \tilde{P}_n\|_2^2 + \sum_k \|\hat{L}_{nk}^p - \tilde{P}_n\|_2^2\right).$$

In the example, l2 distance is to compute the proposal location loss 340 $L^{self\text{-}loc}$, where $\tilde{P}_n = (x_n/W, y_n/H, w_n/W, h_n/H)$ is a normalized version of $P_n$, and W and H denote the width and height of image I respectively.

By optimizing this proposal location loss 340 $L^{self\text{-}loc}$ regarding proposal feature 316 $F_n^p$, noisy proposal features 318 $\hat{F}_n^p$, parameters $\theta^{self\text{-}loc}$ (i.e., $\theta^b$, $\theta^{r\text{-}cnn}$, $\theta^{self\text{-}loc}$), context-aware proposal features are learned, because predicting proposal location in an image requires proposal features understanding some global information of the image. In some embodiments, the relative patch location prediction task is not used directly, because when images are large and there are usually multiple objects in the same image for object detection, which makes relative patch location prediction hard to be solved.

In some embodiments, the self-supervised proposal learning module uses a contrastive loss 342 $L^{self\text{-}cont}$ to learn noise-robust proposal features. For example, at step 382, the SSPL 338 may use a fully-connected layer with parameters $\theta^{self\text{-}cont}$ and an l2 normalization layer to project proposal feature 316 $F_n^p$ and noisy proposal features 318 $\hat{F}_n^p$ to embedded features $F_n^{embed}$ and $\hat{F}_n^{embed}$ (e.g., $\hat{\mathcal{F}}_n^{embed} = \{\hat{F}_{nk}^{embed}\}_{k=1}^K$). In an example, the numbers of the outputs of the fully-connected layer is 128. An example of the contrastive loss 342 $L^{self\text{-}cont}$ may be written as follows:

$$L^{self\text{-}cont}(\{F_n^p\}_{n=1}^N, \hat{\mathcal{F}}_n^p; \theta^{self\text{-}cont}) =$$

$$L^{self\text{-}cont}(\{F_n^{embed}\}_{n=1}^N, \hat{\mathcal{F}}_n^{embed}) = -\frac{1}{K}\sum_k \log \frac{\exp\left((\hat{F}_{nk}^{embed})^T F_n^{embed}/\tau\right)}{\sum_{n'}\exp\left((\hat{F}_{nk}^{embed})^T F_{n'}^{embed}/\tau\right)}.$$

Here $\tau$ is a temperature hyper-parameter. By optimizing the contrastive loss 342 $L^{self\text{-}cont}$ with regard to proposal feature 316 $F_n^p$, noisy proposal features 318 $\hat{F}_n^p$, parameters $\theta^{self\text{-}cont}$ (i.e., $\theta^b$, $\theta^{r\text{-}cnn}$, $\theta^{self\text{-}cont}$), noisy proposal features are enforced to be closer to their original proposal features than to other proposal features, which learns noise-robust proposal features and thus learns noise-robust object detectors.

In some embodiments, an overall self-supervised proposal learning loss $L^{self}$ 344 may be generated using the proposal location loss 340 and the contrastive loss 342, e.g., as follows:

$$L^{self}(\{F_n^p\}_{n=1}^N, \hat{\mathcal{F}}_n^p; \theta^{self}) =$$

$$\lambda^{self\text{-}loc}L^{self\text{-}loc}(F_n^p, \hat{\mathcal{F}}_n^p, P_n; \theta^{self\text{-}loc}) + \lambda^{self\text{-}cont}L^{self\text{-}cont}(\{F_n^p\}_{n=1}^N, \hat{\mathcal{F}}_n^p; \theta^{self\text{-}cont}).$$

Here $\lambda^{self\text{-}loc}$ and $\lambda^{self\text{-}cont}$ are loss weights, and $\theta^{self}$ includes $\theta^{self\text{-}loc}$ and $\theta^{self\text{-}cont}$. The overall self-supervised proposal learning loss $L^{self}$ 344 is optimized with regard to $\theta^b$, $\theta^{r\text{-}cnn}$, and $\theta^{self}$ to learn proposal features.

Consistency-Based Proposal Learning

In some embodiments, consistency losses 346 $L^{cons}$ are applied to ensure consistency between noisy proposal predictions and their original proposal predictions. Different consistency losses may be applied to different predictions, including e.g., bounding box classification predictions and bounding box regression predictions. As shown in the example of FIG. 3, the consistency losses 346 $L^{cons}$ is generated based on original predictions 320 (e.g., obtained through process 398) and noisy predictions 322 (obtained through process 396).

For a classification consistency loss 348 for bounding box classification predictions 322 $C_n^p$ and the corresponding noisy bounding box classification predictions 334, the classification consistency loss $L^{cons\text{-}cls}$ may be computed, for example, as follows:

$$L^{cons\text{-}cls}(C_n^p, \hat{C}_n^p) = \frac{1}{K}\sum_k KL(C_n^p \| \hat{C}_{nk}^p).$$

In the particular example, KL divergence is used as the loss to enforce class predictions from noisy proposals and their original proposals to be consistent.

Unlike image classification only having classification results, object detection also predicts object locations. To further ensure proposal prediction consistency, consistency loss is also computed to enforce object location predictions from noisy proposals and their original proposals to be consistent. For a regression consistency loss 350 $L^{cons\text{-}reg}$ for bounding box regression predictions 324 $R_n^p$ and the corresponding noisy bounding box regression predictions 336, the regression consistency loss $L^{cons\text{-}reg}$ may be computed, for example, as follows:

$$L^{cons\text{-}reg}(R_n^p, \hat{R}_n^p) = \min_k \left(smooth_{\ell_1}(R_n^p - \hat{R}_{nk}^p)\right).$$

In the particular example, smoothed l1 loss is used, and the easiest noisy proposal feature is selected to compute the regression consistency loss $L^{cons\text{-}reg}$ for training stability.

In some embodiments, the overall consistency based proposal learning loss 346 $L^{cons}$ is generated using the one or more consistency losses, for example, as follows:

$$L^{cons}(C_n^p, R_n^p, \hat{C}_n^p, \hat{R}_n^p) = \lambda^{cons\text{-}cls} L^{cons\text{-}cls}(C_n^p, \hat{C}_n^p) + \lambda^{cons\text{-}reg} L^{cons\text{-}reg}(R_n^p, \hat{R}_n^p).$$

Here $\lambda^{cons\text{-}cls}$ and $\lambda^{cons\text{-}reg}$ are loss weights. The overall consistency based proposal learning loss 346 $L^{cons}$ is optimized with regard to $\hat{C}_n^p, \hat{R}_n^p$ (not w.r.t. $C_n^p, R_n^p$), which is therefore optimized with regard to $\theta^b, \theta^{r\text{-}cnn}, \theta^{cls}$, and $\theta^{reg}$. As such, more noisy-robust proposal features and predictions are learned.

In some embodiments, the neural network 300 including its object detectors are trained by applying the fully-supervised loss on labeled dataset $D^l$, and apply the self-supervised proposal learning loss and the consistency-based proposal loss to unlabeled dataset $D^u$. The combined loss L is optimized during the back-propagation process of the training, where the combined loss L may be determined, e.g., as follows:

$$L(I, \mathcal{G}; \theta^b, \theta^{rpn}, \theta^{r\text{-}cnn}, \theta^{cls}, \theta^{reg}, \theta^{self}) =$$

$$\frac{1}{|\mathcal{D}^l|} \sum_{(I,\mathcal{G}) \in \mathcal{D}^l} L^{sup}(I, \mathcal{G}; \theta^b, \theta^{rpn}, \theta^{r\text{-}cnn}, \theta^{cls}, \theta^{reg}) +$$

$$\frac{1}{|\mathcal{D}^u|} \sum_{I \in \mathcal{D}^u} \frac{1}{N} \sum_n L^{self}(\{F_n^p\}_{n=1}^N, \hat{\mathcal{F}}_n^p, P_n; \theta^{self}) +$$

$$\frac{1}{|\mathcal{D}^u|} \sum_{I \in \mathcal{D}^u} \frac{1}{N} \sum_n L^{cons}(C_n^p, R_n^p, \hat{C}_n^p, \hat{R}_n^p).$$

In some embodiments, the neural network 300 including its object detectors are trained by applying the fully-supervised loss on labeled dataset $D^l$, and apply the self-supervised proposal learning loss and the consistency-based proposal loss to both labeled dataset $D^l$ and unlabeled dataset $D^u$. The combined loss L is optimized during the back-propagation process of the training, where the combined loss L may be determined, e.g., as follows:

$$L(I, \mathcal{G}; \theta^b, \theta^{rpn}, \theta^{r\text{-}cnn}, \theta^{cls}, \theta^{reg}, \theta^{self}) =$$

$$\frac{1}{|\mathcal{D}^l|} \sum_{(I,\mathcal{G}) \in \mathcal{D}^l} L^{sup}(I, \mathcal{G}; \theta^b, \theta^{rpn}, \theta^{r\text{-}cnn}, \theta^{cls}, \theta^{reg}) +$$

$$\frac{1}{|\mathcal{D}^l| + |\mathcal{D}^u|} \sum_{I \in \mathcal{D}^l, \mathcal{D}^u} \frac{1}{N} \sum_n L^{self}(\{F_n^p\}_{n=1}^N, \hat{\mathcal{F}}_n^p, P_n; \theta^{self}) +$$

$$\frac{1}{|\mathcal{D}^l| + |\mathcal{D}^u|} \sum_{I \in \mathcal{D}^l, \mathcal{D}^u} \frac{1}{N} \sum_n L^{cons}(C_n^p, R_n^p, \hat{C}_n^p, \hat{R}_n^p).$$

Figure 4:
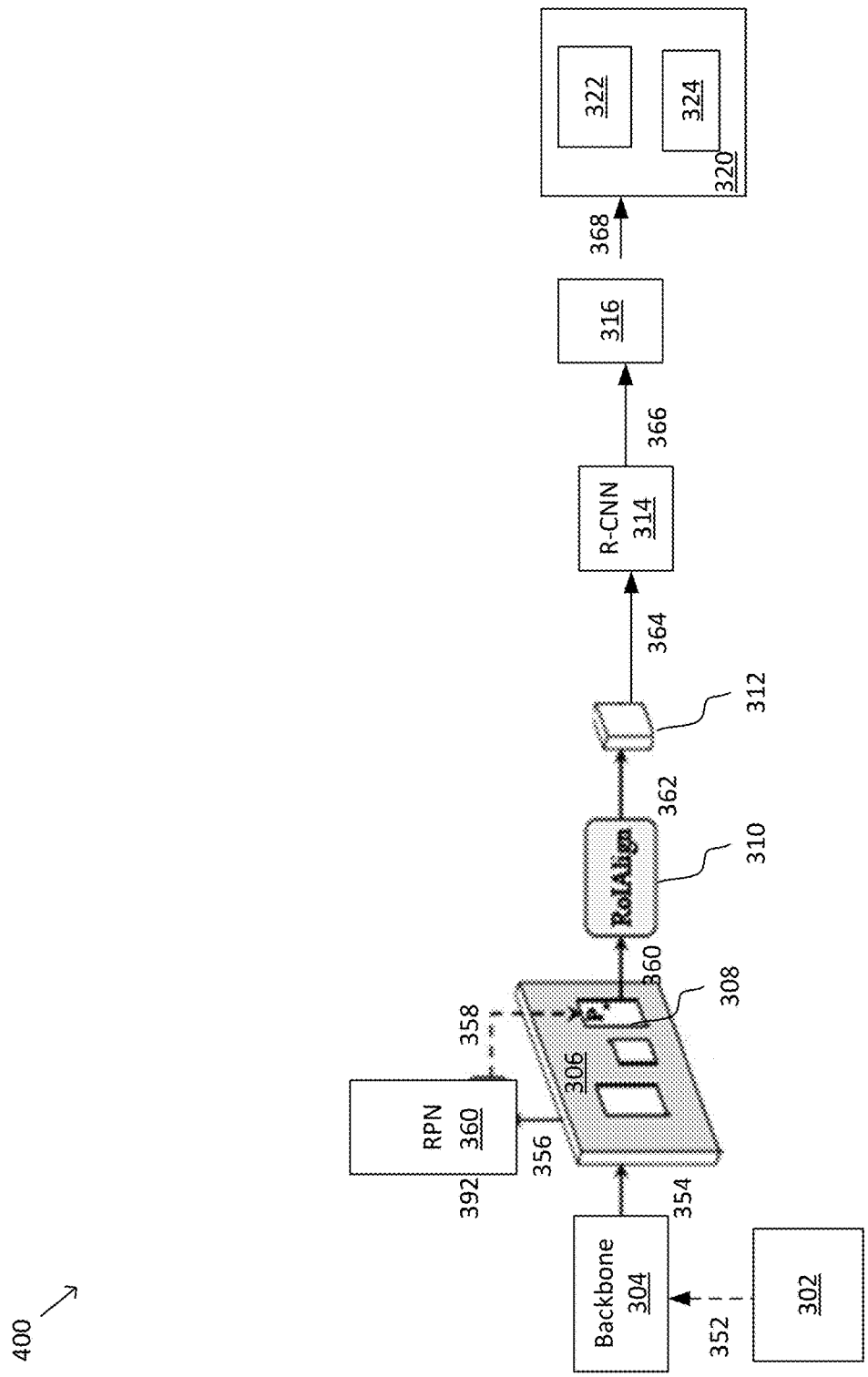
FIG. 4 is a simplified diagram of a trained neural network model for interference according to some embodiments.

Referring to the example of FIG. 4, illustrated is a trained neural network model 400 (e.g., trained neural network 300) for interference. As shown in FIG. 4, during inference, the proposal-based object detectors parts are used without using components like SSPL 338 or consistency computation, and as such, the proposal learning approach does not bring any extra inference computations.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating a neural network for detecting one or more objects in images, comprising:
   generating one or more region proposals that may contain objects for each image of a set of unlabeled images;
   determining one or more proposal features for each of the region proposals and corresponding proposal feature predictions using a proposal convolutional feature map;
   adding noise to the proposal convolutional feature map to generate a noisy proposal convolutional feature map;
   generating one or more noisy proposal features using the noisy proposal convolutional feature map;
   generating one or more self-supervised proposal learning losses based on the one or more proposal features and corresponding proposal feature predictions, and the one or more noisy proposal features and corresponding noisy proposal feature predictions;
   generating one or more consistency-based proposal learning losses based on noisy proposal feature predictions and the corresponding proposal predictions without noise;
   generating a combined loss using the one or more self-supervised proposal learning losses and one or more consistency-based proposal learning losses; and
   updating the neural network based on the combined loss.

2. The method of claim 1, wherein the determining the one or more self-supervised proposal learning losses includes:
   generating one or more proposal location losses using the unlabeled images to learn context-aware features;
   generating one or more contrastive losses using the unlabeled images to learn noise-robust proposal features; and
   generating a first self-supervised proposal learning loss based on the one or more proposal location losses and one or more contrastive losses.

3. The method of claim 2, wherein the generating the one or more contrastive losses include:
   generating a first contrastive loss using the noisy proposal features.

4. The method of claim 3, wherein the generating the one or more contrastive losses include:
   adding noise to the unlabeled images or intermediate features to generate noisy unlabeled images or noisy intermediate features respectively; and
   generating a second contrastive loss using at least one of the noisy unlabeled images and noisy intermediate features.

5. The method of claim 1, wherein the generating the one or more consistency-based proposal learning losses includes:
   generating a first consistency loss using the unlabeled images for bounding box classification predictions;
   generating a second consistency loss using the unlabeled images for bounding box regression predictions; and
   generating the consistency-based proposal learning loss based on the first consistency loss and the second consistency loss.

6. The method of claim 1, further comprising:
   determining one or more fully-supervised losses of the neural network using a set of labeled images; and
   generating the combined loss using the one or more self-supervised proposal learning losses, the one or more consistency-based proposal learning losses, and the one or more fully-supervised losses.

7. The method of claim 6, wherein each of the labeled images includes at least one of an image-level class label and a bounding box label.

8. A non-transitory machine-readable medium comprising a plurality of machine-readable instructions which, when executed by one or more processors, are adapted to cause the one or more processors to perform a method for generating a neural network for detecting one or more objects in images comprising:
   generating one or more region proposals that may contain objects for each image of a set of unlabeled images;
   determining one or more proposal features for each of the region proposals and corresponding proposal feature predictions using a proposal convolutional feature map;
   adding noise to the proposal convolutional feature map to generate a noisy proposal convolutional feature map;
   generating one or more noisy proposal features using the noisy proposal convolutional feature map;
   generating one or more self-supervised proposal learning losses based on the one or more proposal features and corresponding proposal feature predictions and the one or more noisy proposal features and corresponding noisy proposal feature predictions;
   generating one or more consistency-based proposal learning losses based on noisy proposal feature predictions and the corresponding proposal predictions without noise;
   generating a combined loss using the one or more self-supervised proposal learning losses and one or more consistency-based proposal learning losses; and
   updating the neural network based on the combined loss.

9. The non-transitory machine-readable medium of claim 8, wherein the determining the one or more self-supervised proposal learning losses includes:
   generating one or more proposal location losses using the unlabeled images to learn context-aware features;
   generating one or more contrastive losses using the unlabeled images to learn noise-robust proposal features; and
   generating a first self-supervised proposal learning loss based on the one or more proposal location losses and one or more contrastive losses.

10. The non-transitory machine-readable medium of claim 9, wherein the generating the one or more contrastive losses include:
   generating a first contrastive loss using the noisy proposal features.

11. The non-transitory machine-readable medium of claim 10, wherein the generating the one or more contrastive losses include:
   adding noise to the unlabeled images or intermediate features to generate noisy unlabeled images or noisy intermediate features respectively; and
   generating a second contrastive loss using at least one of the noisy unlabeled images and noisy intermediate features.

12. The non-transitory machine-readable medium of claim 8, wherein the generating the one or more consistency-based proposal learning losses includes:
   generating a first consistency loss using the unlabeled images for bounding box classification predictions;
   generating a second consistency loss using the unlabeled images for bounding box regression predictions; and
   generating the consistency-based proposal learning loss based on the first consistency loss and the second consistency loss.

13. The non-transitory machine-readable medium of claim 8, wherein the method further comprises:
   determining one or more fully-supervised losses of the neural network using a set of labeled images; and
   generating the combined loss using the one or more self-supervised proposal learning losses, the one or more consistency-based proposal learning losses, and the one or more fully-supervised losses.

14. The non-transitory machine-readable medium of claim 13,
   wherein each of the labeled images includes at least one of an image-level class label and a bounding box label.

15. A system, comprising:
   a non-transitory memory; and
   one or more hardware processors coupled to the non-transitory memory and configured to read instructions from the non-transitory memory to cause the system to perform a method for generating a neural network for detecting one or more objects in images comprising:
   generating one or more region proposals that may contain objects for each image of a set of unlabeled images;
   determining one or more proposal features for each of the region proposals and corresponding proposal feature predictions using a proposal convolutional feature map;
   adding noise to the proposal convolutional feature map to generate a noisy proposal convolutional feature map;
   generating one or more noisy proposal features using the noisy proposal convolutional feature map;
   generating one or more self-supervised proposal learning losses based on the one or more proposal features and corresponding proposal feature predictions and the one or more noisy proposal features and corresponding noisy proposal feature predictions;
   generating one or more consistency-based proposal learning losses based on noisy proposal feature predictions and the corresponding proposal predictions without noise;
   generating a combined loss using the one or more self-supervised proposal learning losses and one or more consistency-based proposal learning losses; and
   updating the neural network based on the combined loss.

16. The system of claim 15, wherein the determining the one or more self-supervised proposal learning losses includes:
   generating one or more proposal location losses using the unlabeled images to learn context-aware features;
   generating one or more contrastive losses using the unlabeled images to learn noise-robust proposal features; and
   generating a first self-supervised proposal learning loss based on the one or more proposal location losses and one or more contrastive losses.

17. The system of claim 15, wherein the generating the one or more contrastive losses include:
   generating a first contrastive loss using the noisy proposal features.

18. The system of claim 15, wherein the generating the one or more contrastive losses include:
   adding noise to the unlabeled images or intermediate features to generate noisy unlabeled images or noisy intermediate features respectively; and
   generating a second contrastive loss using at least one of the noisy unlabeled images and noisy intermediate features.

19. The system of claim 15, wherein the generating the one or more consistency-based proposal learning losses includes:
   generating a first consistency loss using the unlabeled images for bounding box classification predictions;
   generating a second consistency loss using the unlabeled images for bounding box regression predictions; and
   generating the consistency-based proposal learning loss based on the first consistency loss and the second consistency loss.

20. The system of claim 15, wherein the method further comprises:
   determining one or more fully-supervised losses of the neural network using a set of labeled images; and
   generating the combined loss using the one or more self-supervised proposal learning losses, the one or more consistency-based proposal learning losses, and the one or more fully-supervised losses.

* * * * *